(12) United States Patent
Samuelsson

(10) Patent No.: US 6,379,723 B1
(45) Date of Patent: *Apr. 30, 2002

(54) ANIMAL FEED OF HIGHER NUTRITIVE VALUE, METHOD FOR PRODUCTION THEREOF AND USE OF A POLYETHYLENE GLYCOL COMPOUND

(75) Inventor: Anne-Cathrine Samuelsson, Lilla Edet (SE)

(73) Assignee: Akzo Nobel, N.V., Arnhem (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 82 days.

(21) Appl. No.: 08/817,356
(22) PCT Filed: Oct. 3, 1995
(86) PCT No.: PCT/EP95/03910
    § 371 Date: Jun. 20, 1997
    § 102(e) Date: Jun. 20, 1997
(87) PCT Pub. No.: WO96/11585
    PCT Pub. Date: Apr. 25, 1996

(30) Foreign Application Priority Data
Oct. 13, 1994 (SE) ................................................. 9403484

(51) Int. Cl.⁷ ................................ A23L 1/30; A23K 1/16
(52) U.S. Cl. ........................ 426/2; 426/74; 426/630; 426/807
(58) Field of Search ................... 426/74, 807, 630, 426/2; 514/723, 724

(56) References Cited

U.S. PATENT DOCUMENTS

| | | | | |
|---|---|---|---|---|
| 1,958,295 A | * | 5/1934 | Christensen et al. | 99/11 |
| 2,472,663 A | * | 6/1949 | Kleine et al. | 99/2 |
| 2,802,307 A | * | 8/1957 | Belasco et al. | 47/58 |
| 2,819,301 A | * | 1/1958 | Monson et al. | 260/518 |
| 3,336,136 A | * | 8/1967 | Peeler | 99/2 |
| 3,397,990 A | * | 8/1968 | Hochstein | 99/2 |
| 3,401,039 A | * | 9/1968 | Gordon et al. | 99/2 |
| 3,410,690 A | * | 11/1968 | Lindburg | 99/4 |
| 3,421,898 A | * | 1/1969 | Erwin et al. | 99/2 |
| 3,458,625 A | * | 7/1969 | Ensor et al. | 424/95 |
| 3,598,605 A | * | 8/1971 | van Limborgh | 99/2 |
| 3,617,299 A | | 11/1971 | Mattoon et al. | 99/2 R |
| 3,697,659 A | * | 10/1972 | Marco | 424/325 |
| 4,186,212 A | * | 1/1980 | Howell | 424/343 |
| 4,749,577 A | * | 6/1988 | Voege et al. | 426/74 |
| 4,797,275 A | * | 1/1989 | Brooks et al. | 424/78 |
| 5,194,264 A | * | 3/1993 | Van Tonder | 424/405 |
| 5,561,131 A | * | 10/1996 | Hart | 514/245 |
| 5,607,681 A | * | 3/1997 | Galley et al. | 424/405 |
| 5,744,137 A | * | 4/1998 | Stone | 424/184.1 |

FOREIGN PATENT DOCUMENTS

| | | |
|---|---|---|
| EP | 0 197 188 | 10/1986 |
| EP | 0 207 344 | 1/1987 |
| EP | 0 217 631 | 4/1987 |
| EP | DE 3934010 | 4/1990 |
| FR | 1 349 230 | 10/1962 |
| WO | WO 93/02680 | 2/1993 |
| WO | WO 95/28091 | 10/1995 |

OTHER PUBLICATIONS

Chemicals Abstract No. 33830r, vol. 121, Jul. 18, 1994.

* cited by examiner

*Primary Examiner*—Nina Bhat
(74) *Attorney, Agent, or Firm*—Ralph J. Mancini; Lainie E. Parker

(57) ABSTRACT

Animal feed is disclosed, which contains a polyethylene glycol compound selected from a group consisting of: a) a polyethylene glycol having a molecular weight of 3,000–15,000; b) an ethoxylate of a carboxylic acid having 8–24 carbon atoms; c) an ethoxylate of a mono-, di- or triglyceride containing at least one acyl group having 8–24 carbon atoms; d) an ethoxylate of a mono-, di- or triester of sorbita with a carboxylic ester having 8–24 carbon atoms; and e) an ethoxylate of an alcohol having 8–24 carbon atoms, wherein the ethoxylates b), c), d) and e) have a molecular weight of 15,000 at most and, in an amount of more than 75% by weight, consist of ethyleneoxy units. In addition to the polyethylene glycol compound, the animal feed may also contain 10–70% by weight of cereals, 0–15% by weight of feed fat, 10–50% by weight of protein-containing nutritious substances other than cereals, and 1–10% by weight of vitamins, minerals, enzymes, flavourings, antibiotics, probiotics and other animal feed additives. By the presence of the polyethylene glycol compound, the nutrient value of the feed is improved. The feed is suitably fed to poultry, pigs and calves. Moreover, a method of producing the animal feed is disclosed.

30 Claims, No Drawings

ANIMAL FEED OF HIGHER NUTRITIVE VALUE, METHOD FOR PRODUCTION THEREOF AND USE OF A POLYETHYLENE GLYCOL COMPOUND

The present invention relates to the use of a polyethylene glycol compound which is a polyethylene glycol having a molecular weight of 3,000–15,000 and/or a special ethylene oxide adduct which in an amount of at least 75% by weight consists of ethyleneoxy units in an animal feed, which contains pulverulent or granular nutritious substances. The addition of the polyethylene glycol compound to the feed has been found to improve the nutritive value of the feed, for instance for poultry, pigs and calves.

It is generally known to disperse fat in water with the aid of surface-active agents, such as castor oil ethoxylate and lecithin, in order to obtain a formula primarily destined for calves. It is also known to incorporate surface-active compounds into pulverulent or granular feed based on cereals and fat, by admixing them to a fatty phase which is in the liquid state, optionally after heating, so as to increase the availability of the nutritive value of the fat.

From, for instance, a doctor's thesis by Christoph Gunther: Einfluss von Emulgatoren auf die Verwendung tierischen Fettes von Masthünerküken at the Hohe Landwirtschaftlische Fakultät der Reinischen Friedrich-Wilheims-Universität zu Bonn, Feb. 16, 1988, it is thus known to produce a chicken-feed by mixing various nutritious substances, such as cereals and melted fat. Emulsifiers, such as soybean lecithin, sugar ester, polyoxyethylene glyceryl monostearate and mixtures of castor oil ethoxylate and soybean lecithin are added to the fat in order to improve its digestibility.

From an article entitled Growth Promotion in Broilers by Copolymer CRL 87-61', by J. P. Texton et al in J.APPL. Poultry Res. (1992)1, pp 373–81, it is also known to add nonionic surface-active block copolymers of ethylene oxide and propylene oxide, for example in contents of 10 ppm, to chicken-feed in an attempt at promoting the growth of chickens. According to the article, the surface-active co-polymer was mixed first with a premix of maize meal and then with the remaining ingredients of the feed. When the chickens were fed with this feed, their growth increased somewhat and their mortality was reduced after 42 days, but not after 21 days. The results obtained have, however, been questioned by William A Duclley-Cash in an article published in Feedstuffs, Mar. 1, 1993, p. 13.

Furthermore, EP-A-217 631 discloses the addition of a water-soluble adjuvent such as a polyethylene glycol having a molecular weight of from about 4000 to about 8000 and a melting point of from 50° C. to 85° C. to a feed premix containing nicarbazin in order to reduce the drawbacks caused by the electrostatic properties of nicarbazin.

The object of the present invention is to improve the availability of the nutritious substances in conventional animal feed, especially for poultry, pigs and calves, in order to increase the growth per weight unit of feed and/or the daily growth while reducing the mortality.

It has now surprisingly been found that this object can be achieved by using a polyethylene glycol compound selected from a group consisting of a) a polyethylene glycol having a molecular weight of 3,000–15,000, b) an ethoxylate of a carboxylic acid having 8–24 carbon atoms, c) an ethoxylate of a mono-, di- or triglyceride containing at least one acyl group having 8–24 carbon atoms, d) an ethoxylate of a mono-, di- or triester of sorbitan with a carboxylic ester having 8–24 carbon atoms, and e) an ethoxylate of an alcohol having 8–24 carbon atoms, wherein the ethoxylates b), c), d) and e) have a molecular weight of 15,000 at most and in an amount of more than 75% by weight consist of ethyleneoxy units in order to improve the nutrient value of an animal feed containing pulverulent or granular nutritious substances. The reason why the presence of the polyethylene glycol compound results in a higher nutritive value is not known, but it would seem that the strongly hydrophilic polyethylene glycol compound increases the availability of the pulverulent or granular nutritious substances and/or facilitates the assimilation thereof. The amount of the polyethylene glycol compound usually is 10–1500 ppm, preferably 20–500 ppm.

The polyethylene glycol compound, which is hydrophilic, has a HLB value of at least 15, preferably at least 17. It preferably has a molecular weight of 5,000–12,000 and preferably contains more than 85% by weight of ethyleneoxy units. Suitable compounds are e.g. polyethylene glycols, such as polyethylene glycol having a molecular weight of about 6,000. The ethoxylates according to b)–e) are suitably based on naturally occurring compounds which are biologically compatible. Examples are ethoxylates of fatty acids having 8–24 carbon atoms, preferably 10–22 carbon atoms, which means mono- or diesters with oleic acid, soybean fatty acids, tallow fatty acids, rape-seed fatty acids, linseed oil fatty acids and coconut fatty acids; ethoxylates of mono-, di- or triglycerides, such as ethoxylates of glycerides based on tallow fatty acids, oleic acid, soybean fatty acids, rape-seed fatty acids and coconut fatty acids; and ethoxylates of mono-, di- or triesters between sorbitan and fatty acids, such as tallow fatty acids, oleic acid, soybean fatty acids, castor-oil fatty acids, rape-seed fatty acids and coconut fatty acids. Further examples of polyethylene glycol compounds are alcohol ethoxylates, in which the alcohol has been obtained by hydration of natural fatty acids having 8–24, preferably 10–22 carbon atoms. A most convenient ethoxylate is castor-oil ethoxylate having a molecular weight of about 5,000 to about 11,000, which promotes both the growth and the health of the animals even at low dosages.

The present invention also encompasses an animal feed, which preferably is dry and contains a polyethylene glycol compound selected from the groups b)–e).

When producing the animal feed where a polyethylene glycol compound of the present invention are used, the polyethylene compound is suitably produced by mixing the polyethylene glycol compound, which optionally is dissolved or suspended in water and/or applied to a carrier, with the pulverulent or granular nutritious substances or other solid components of the animal feed or a mixture of two or more of these components. If the feed contains a liquid hydrophobic component, such as a lipid or a carboxylic acid, this component is suitably added before or after mixing the polyethylene glycol compound with the pulverulent or granular nutritious substances or other solid components. It is also possible to add the polyethylene glycol compound directly to the liquid hydrophobic component, since the strongly hydrophilic polyethylene glycol compound is not soluble or easily emulsifiable in the hydrophobic component.

When preparing the animal feed, a premix is suitably prepared, consisting of e.g. vitamins, flavourings, minerals, enzymes, antibiotics and probiotics. It is possible to add to the premix dry components consisting of cereals, such as ground or crushed wheat, oats, barley, maize and rice;

vegetable protein feed based on e.g. rape, soy and sunflower; animal protein feed, such as protein E, blood meal, bone meal and fish meal; molasses; and milk products, such as various milk powders and whey powders. To this mixture or to the premix, addition is suitably made of the polyethylene glycol compound, optionally dissolved or emulsified in water and/or applied to a carrier, which consists of e.g. ground cereals, starch or inorganic minerals, such as silicates. After mixing all the dry additives, the hydrophobic component, which is liquid, optionally after heating, can be added. It may consist of lipids, such as fat, and/or of carboxylic acids, such as a fatty acid. The lipids usually consist of slaughter fat and vegetable fat, optionally liquefied by heating. After thorough mixing, a mealy or particulate composition is obtained, depending on the degree of grinding of the ingredients. If required, the hydrophobic component, which is liquid, optionally after heating, can be added to the solid pulverulent or particulate components, or a part thereof, in order to produce a solid pulverulent mixture before adding the polyethylene glycol compound.

Within the scope of the invention, it is also possible to produce a suspension of the animal feed. This is especially convenient if the feed is prepared for immediate consumption.

Animal feed according to the invention usually contains, in addition to the polyethylene glycol compound, 0–80, preferably 10–70% by weight of cereals; 0–30, preferably 0–15 and most preferred 1–8% by weight of feed fat; 0–85, preferably 10–50% by weight of protein-containing nutritious substances of a type other than cereals; and 0–12, preferably 1–10% by weight of vitamins, minerals, enzymes, flavourings, antibiotics, probiotics, and optionally other additives usually included in animal feed. To prevent separation during storage, one should suitably add water to the animal feed and subject it to a conventional pelletising, expanding or extruding process. If, after such treatment, the animal feed contains an excess of water, this can be removed by drying. If considered suitable, the resulting granular animal feed can also be crushed to a smaller particle size.

The present invention will now be further illustrated with the aid of the following Examples.

EXAMPLE 1

Two different sorts of chicken-feed according to the invention were produced by adding to wheat bran either 0.01 parts by weight of castor oil ethoxylated with 200 mole of ethylene oxide per mole of castor oil (RO 200) or 0.01 parts by weight of polyethylene glycol having a molecular weight of 6,000 (PEG 6000), or 0.03 parts by weight of PEG 6000. The total amount of the polyethylene glycol compound and the wheat bran was 0.3 parts by weight. This mixture was then incorporated into the remaining ground cereals, meat meal, tapioca meal and a premix containing vitamins and minerals. Melted feed fat and molasses were added to this dry mixture under agitation. Finally, a small amount of water was added and the chicken-feed was pelletised and dried.

Moreover, two feed compositions were produced for comparative purposes, one composition containing 0.10 parts by weight of an ethylene oxide/propylene oxide block polymer (Pluronic PE 6800) having an ethyleneoxy content of about 80% by weight, and the other composition having no additive.

The different sorts of chicken-feed produced had the following composition.

TABLE 1

| | Components, parts by weight of feed composition | | | | |
|---|---|---|---|---|---|
| Components | 1 RO 200 | 2 PEG 6000 | 3 PEG 6000 | A Pluronic | B — |
| Crushed barle | 35.0 | 35.0 | 35.0 | 35.0 | 35.0 |
| Crushed wheat | 21.0 | 21.0 | 21.0 | 21.0 | 21.0 |
| Wheat bran | 0.29 | 0.29 | 0.27 | 0.2 | 3.0 |
| Additive | 0.01 | 0.01 | 0.03 | 0.1 | — |
| Tapioca meal | 7.0 | 7.0 | 7.0 | 6.0 | 6.0 |
| Soybean meal | 24.0 | 24.0 | 24.0 | 24.0 | 24.0 |
| Meat meal | 5.0 | 5.0 | 5.0 | 5.0 | 5.0 |
| Feed fat | 5.0 | 5.0 | 5.0 | 5.0 | 5.0 |
| Molasses | 2.0 | 2.0 | 2.0 | 2.0 | 2.0 |
| Premix | 2.0 | 2.0 | 2.0 | 2.0 | 2.0 |

210 broilers distributed between 14 cages each containing 15 broilers were fed per feed composition. The increase in weight, feed intake, feed index (feed intake/increase in weight) and the relative feed conversion of the broilers were determined. The following results were obtained

TABLE 2

| | Results | | | | |
|---|---|---|---|---|---|
| | Composition | | | | |
| | 1 | 2 | 3 | 4 | 5 |
| 0–20 days | | | | | |
| Growth, g | 552 | 561 | 574 | 523 | 536 |
| Feed intake, g | 789 | 797 | 832 | 761 | 766 |
| Feed index | 1.43 | 1.42 | 1.45 | 1.46 | 1.43 |
| 0–40 days | | | | | |
| Growth, g | 1742 | 1725 | 1759 | 1546 | 1556 |
| Feed intake, g | 3048 | 3001 | 3076 | 2868 | 2832 |
| Feed index | 1.75 | 1.74 | 1.75 | 1.86 | 1.82 |

The measured results indicate that the test animals, when given feed produced according to the invention, showed better growth than if given the comparative feed. At the same time, a lower feed index was obtained for the 40-day value, i.e. a lower feed intake per increase in weight with the feed produced according to the invention.

EXAMPLE 2

A composition corresponding to composition 1 in Example 1 was produced by mixing all the components except the feed fat and wheat bran with the castor oil ethoxylate. Under agitation, the feed fat, that had been liquefied by heating, was then added to this feed mixture, so that the feed fat was finely divided and a dry particulate free-flowing feed mixture was obtained. Subsequently, wheat bran with the castor oil ethoxylate was added to this mixture under agitation. Finally, a small amount of water was added, and the chicken-feed was granulated and dried.

As in Example 1, broilers were fed, and their increase in weight, feed intake, feed index and relative feed consumption were determined. The results obtained agreed very well with the results obtained in Example 1.

EXAMPLE 3

Different sorts of thicken-feed were produced by adding six different polyalkylene glycol compounds in the amounts indicated in the table below to 0.3 parts by weight of boiled wheat starch.

TABLE 3

| Test | Compound | % EO by weight | Parts by weight |
|---|---|---|---|
| 1 | Ethoxylated sorbitan monooleate | 80 | 0.01 |
| 2 | Ethoxylated soybean fatty acid | 80 | 0.01 |
| 3 | Ethoxylated castor oil | 83 | 0.01 |
| 4 | Ethoxylated castor oil | 91 | 0.01 |
| 5 | Ethoxylated castor oil | 91 | 0.005 |
| Comp | Ethoxylated castor oil | 66 | 0.10 |

The obtained mixtures were then blended with 100 parts by weight of a basic chicken feed composition with the following ingredients.

TABLE 4

| Feed Composition | |
|---|---|
| Ingredients | Parts by weight |
| Crushed barley | 35 |
| Crushed wheat | 21 |
| Tapioca meal | 6 |
| Soybean meal | 24 |
| Meat meal | 5 |
| Feed fat | 5 |
| Molasses | 2 |
| Premix | 2 |

The premix contained vitamines and minerals.

210 broilers distributed between 14 cages each containing 15 broilers were fed per feed composition. The increase in weight, the feed intake and feed index (feed intake/increase in weight) were determined. The following results were obtained after 40 days.

TABLE 5

| | Results | | | | | |
|---|---|---|---|---|---|---|
| Tests | 1 | 2 | 3 | 4 | 5 | Comp. |
| Growth, g | 1708 | 1694 | 1745 | 1728 | 1725 | 1655 |
| Feed intake, g | 3057 | 3049 | 3106 | 3110 | 3036 | 3029 |
| Feed index | 1.79 | 1.80 | 1.78 | 1.80 | 1.76 | 1.83 |

From the results it is evident that the use of polyethylene glycol compounds in accordance with the invention improves the growth of the broilers and the feed index in comparison with the use of ethoxylated castor oil having a content of only 66% by weight of EO-derived units, although the addition of this compound was 10–20 times higher.

What is claimed is:

1. A method for improving the availability of nutritious substances in animal feed containing pulverulent or granular nutritious substances which comprises adding to said feed at least one polyethylene glycol compound, selected from a group consisting of
   a) a polyethylene glycol having a molecular weight of 3,000–15,000,
   b) an ethoxylate of a carboxylic acid having 8–24 carbon atoms,
   c) an ethoxylate of a mono-, di- or triglyceride containing at least one acyl group having 8–24 carbon atoms,
   d) an ethoxylate of a mono-, di- or triester of sorbitan with a carboxylic ester having 8–24 carbon atoms, and
   e) an ethoxylate of an alcohol having 8–24 carbon atoms, wherein, the ethoxylates, b), c), d) and e) have a molecular weight of up to 15,000 and contain more than 75% by weight of ethyleneoxy units.

2. The method of claim 1, wherein the polyethylene glycol a) has a molecular weight of 5,000–12,000, and the ethoxylates b), c), d) and e) contain more than 85% by weight of ethyleneoxy units.

3. The method of claim 1, wherein ethoxyates b), c), d) and e) contain at least 80% by weight of ethyleneoxy units.

4. A method for improving the availability of nutritious substances in animal feed containing pulverulent or granular nutritious substances which comprises adding to said feed at least one polyethylene glycol compound, selected from a group consisting of
   a) a polyethylene glycol having a molecular weight of 3,000–15,000,
   b) an ethoxylate of a carboxylic acid having 8–24 carbon atoms,
   c) an ethoxylate of a mono-, di- or triglyceride containing at least one acyl group having 8–24 carbon atoms, and
   d) an ethoxylate of a mono-, di- or triester of sorbitan with a carboxylic ester having 8–24 carbon atoms,
wherein, the ethoxylates, b), c), and d) have a molecular weight of up to 15,000 and contain more than 75% by weight of ethyleneoxy units.

5. The method of claim 4, wherein the polyethylene glycol a) has a molecular weight of 5,000–12,000, and the ethoxylates b), c), and d) contain more than 85% by weight of ethyleneoxy units.

6. The method of claim 4, wherein ethoxylates b), c), and d) contain at least 80% by weight of ethyleneoxy units.

7. The method of claim 4, wherein ethoxylates b), c), and d) contain at least 83% by weight of ethyleneoxy units.

8. The method of claim 4, wherein the polyethylene glycol compound consists of a castor oil ethoxylate.

9. The method of claim 8 wherein the castor oil ethoxylate has a molecular weight of 5,000–11,000.

10. The method of claim 4, wherein the polyethylene glycol compound constitutes 10–1500 ppm, based on the weight of the animal feed.

11. The method of claim 4 wherein the polyethylene glycol compound constitutes 20–500 ppm based on the weight of the animal feed.

12. The method of claim 4, wherein ethoxylates b), c), and d) have a molecular weight of 5,000 to 12,000 at most.

13. The method of claim 4, wherein the polyethylene glycol compound is ethoxylated castor oil containing at least 83% by weight of ethyleneoxy units.

14. The method of claim 13, wherein the ethoxylated castor oil has a molecular weight of 5,000–12,000.

15. The method of claim 13, wherein the ethoxylated castor oil constitutes 10–1500 ppm, based on the weight of the animal feed.

16. Animal feed containing pulverulent or granular nutritious substances and, optionally, other solid components, which additionally comprises at least one polyethylene glycol compound selected from a group consisting of
   a) an ethoxylate of a carboxylic acid having 8–24 carbon atoms,
   b) an ethoxylate of a mono-, di- or triglyceride containing at least one acyl group having 8–24 carbon atoms, and
   c) an ethoxylate of a mono-, di- or triester of sorbitan with a carboxylic ester having 8–24 carbon atoms,
wherein the ethoxylates a), b), and c) have a molecular weight of up to 15,000 and contain more than 75% by weight of ethyleneoxy units.

17. Animal feed of claim 16, wherein the polyethylene glycol compound contains more than 85% by weight of ethyleneoxy units and has a molecular weight of 5,000 to 12,000 at most.

18. Animal feed of claim 16, which comprises, in addition to the polyethylene glycol compound, 10–70% by weight of cereals, 0–15% by weight of feed fat, 10–50% by weight of protein-containing nutritious substances other than cereals, and 1–10% by weight of vitamins, minerals, enzymes, flavorings, antibiotics, probiotics and other animal feed additives.

19. Animal feed of claim 18 which contains 1–8% by weight of feed fat.

20. A method for producing the animal feed of claim 18, which comprises admixing the polyethylene glycol compound with the solid components of the animal feed.

21. The method of claim 20 wherein said solid components comprise pulverulent or granular nutritious substances.

22. The method of claim 20 wherein said polyethylene glycol compound is dissolved or suspended in water prior to admixing with the solid components of the animal feed.

23. The method of claim 20 wherein said polyethylene glycol compound is applied to a carrier prior to admixing with the solid components of the animal feed.

24. The animal feed of claim 16 wherein the polyethylene glycol compound is a castor oil ethoxylate.

25. The animal feed of claim 24 wherein the castor oil ethoxylate has a molecular weight of 5,000–11,000.

26. Animal feed of claim 16, wherein ethoxylates a), b), and c) contain at least 80% by weight of ethyleneoxy units.

27. Animal feed of claim 16, wherein ethoxylates a), b), and c) contain at least 83% by weight of ethyleneoxy units.

28. Animal feed of claim 16, wherein the polyethylene glycol compound is ethoxylated castor oil containing at least 83% by weight of ethyleneoxy units.

29. Animal feed of claim 28, wherein the ethoxylated castor oil has a molecular weight of 5,000–12,000.

30. Animal feed of claim 28, wherein the ethoxylated castor oil constitutes 10–1500 ppm, based on the weight of the animal feed.

* * * * *